United States Patent
Munakata et al.

(10) Patent No.: US 6,623,890 B2
(45) Date of Patent: Sep. 23, 2003

(54) POSITIVE ELECTRODE MATERIAL AND BATTERY FOR NONAQUEOUS ELECTROLYTE SECONDARY BATTERY

(75) Inventors: Fumio Munakata, Yokohama (JP); Tatsuhiro Fukuzawa, Kanagawa (JP); Yasuhiko Ohsawa, Kanagawa (JP); Yuuji Tanjo, Yokohama (JP); Takuya Mihara, Kanagawa (JP); Takashi Kimura, Kanagawa (JP); Kazuo Sunahara, Kanagawa (JP); Manabu Suhara, Kanagawa (JP)

(73) Assignees: Nissan Motor Co., Ltd., Yokohama (JP); Seimi Chemical Co., Ltd., Chigasaki (JP)

( * ) Notice: Subject to any disclaimer, the term of this patent is extended or adjusted under 35 U.S.C. 154(b) by 207 days.

(21) Appl. No.: 09/791,877

(22) Filed: Feb. 26, 2001

(65) Prior Publication Data

US 2001/0024753 A1 Sep. 27, 2001

(30) Foreign Application Priority Data

Mar. 3, 2000 (JP) .................................... 2000-058097

(51) Int. Cl.$^7$ ............................................. H01M 10/24
(52) U.S. Cl. ................................. 429/231.95; 429/224
(58) Field of Search ......................... 429/218.1, 231.95, 429/224

(56) References Cited

U.S. PATENT DOCUMENTS

| | | | | |
|---|---|---|---|---|
| 5,316,877 A | * | 5/1994 | Thackeray et al. | 429/338 |
| 6,071,645 A | * | 6/2000 | Biensan et al. | 429/223 |
| 6,168,888 B1 | | 1/2001 | Iwata et al. | 429/231.95 |
| 6,368,750 B1 | * | 4/2002 | Nemoto et al. | 429/231.95 |

FOREIGN PATENT DOCUMENTS

| | | | | |
|---|---|---|---|---|
| EP | 1 032 061 | | 8/2000 | |
| JP | 06044973 | * | 2/1994 | H01M/4/58 |
| JP | 2870741 | | 1/1999 | |
| JP | 11-71115 | | 3/1999 | |
| JP | 11-73962 | | 3/1999 | |
| JP | 11-171550 | | 6/1999 | |
| JP | 11001323 | * | 11/1999 | H01M/10/40 |

OTHER PUBLICATIONS

Yamanaka Shoji, "Lithium Secondary Battery and Manufacture Thereof", Patent Abstracts of Japan, vol. 18, No. 263, Publication No. 06044973, Feb. 18, 1994.

Yamanaka Shoji, "Positive Electrode Material for Lithium Secondary Battery and its Manufacture and Lithium Secondary Battery Using It", Patent Abstracts of Japan, vol. 1997, No. 02, Publication No. 08273665, Oct. 18, 1996.

Mishima Hiromitsu, "Lithium Secondary Battery.", Patent Abstracts of Japan, vol. 17, No. 57, Publication No. 04267053, Sep. 22, 1992.

Tsutomu Ohzuku et al., "LiMnO$_2$ As Cathode For Secondary Lithium Cell", Chemistry Express, vol. 7, No. 3, pp. 193–196, (1992), Kinki Chemical Society, Japan, XP 000431611.

Tsutomu Ohzuku et al., "Comparative study of Li [Li$_x$Mn$_{2-x}$]O$_4$ and LT–LiMnO$_2$ for lithium–ion batteries", Journal of Power Sources vol. 68, No. 2, pp. 646–651, (1997).

K. Numata et al., "Preparation and electrochemical properties of layered lithium–cobalt–managenese oxides.", Solid State Ionics, vol. 118, No. 1–2, pp. 117–120, (1999).

A. Robert Armstrong et al., "Synthesis of Layered LiMnO2 As An Electrode For Rechargeable Lithium Batteries," Nature, vol. 381, Issue No. 6582, Jun. 6, 1996, pp. 499–500, published by Macmillian Magazines, Ltd.

* cited by examiner

Primary Examiner—Randy Gulakowski
Assistant Examiner—Monique Wills
(74) Attorney, Agent, or Firm—Foley & Lardner

(57) ABSTRACT

A positive electrode active material for a nonaqueous electrolyte secondary battery includes at least a lithium-containing manganese layered composite oxide represented by the general formula $Li_{1-x}Mn_{1-y}M_yO_{2-\delta}$. The lithium-containing manganese composite oxide is deficient in lithium with respect to the stoichiometric composition of a layered crystal structure represented by the general formula $LiMeO_2$. Part of Mn is replaced by a substitute metal such as Co, Ni, Fe, Al, Ga, In, V, Nb, Ta, Ti, Zr, Ce or Cr.

20 Claims, 1 Drawing Sheet

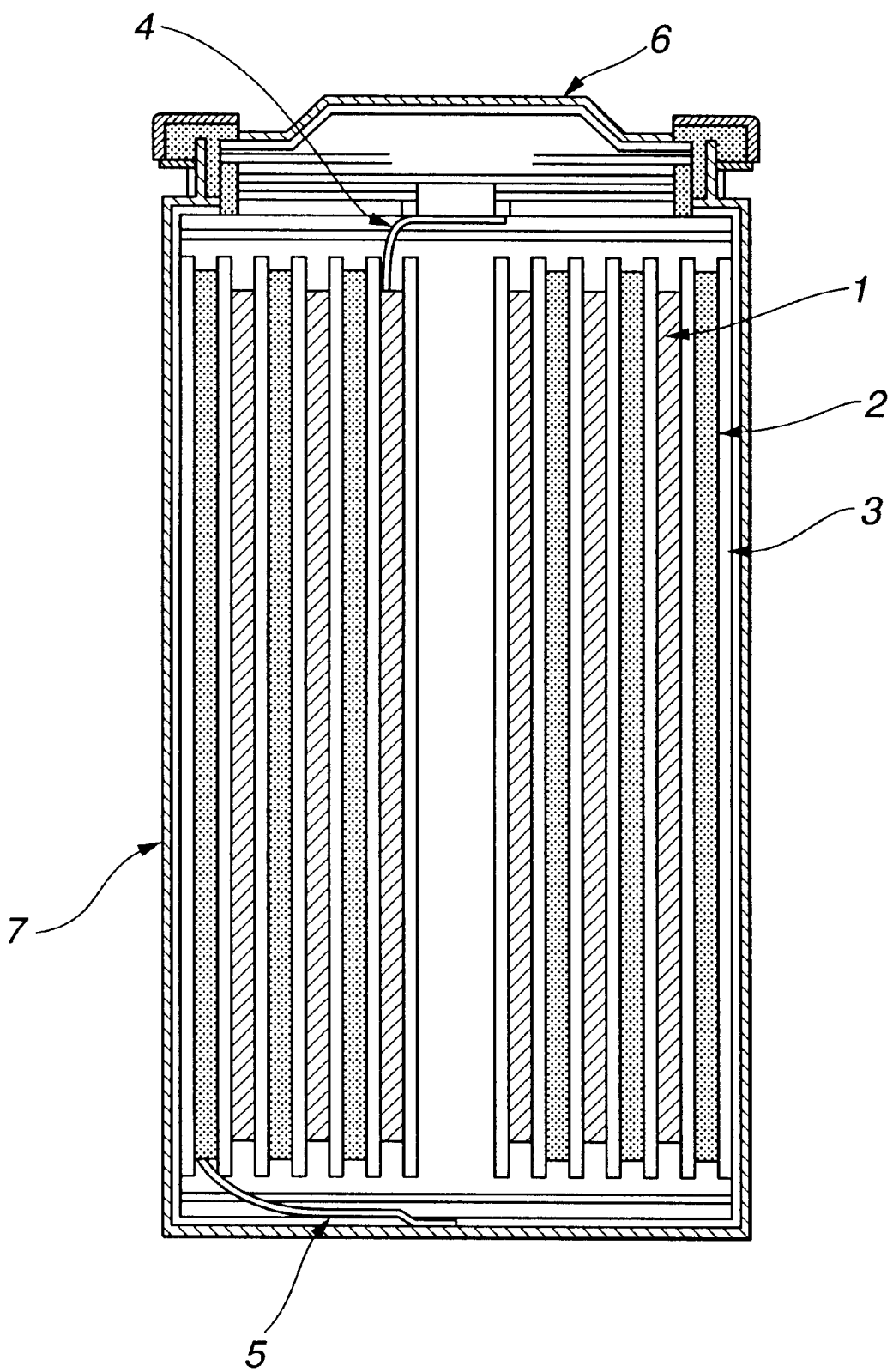

POSITIVE ELECTRODE MATERIAL AND BATTERY FOR NONAQUEOUS ELECTROLYTE SECONDARY BATTERY

BACKGROUND OF THE INVENTION

The present invention relates to positive electrode active material and lithium secondary batteries. More specifically, the present invention relates to lithium-deficient manganese layered composite oxide advantageous in cycle stability and capacity as compared to a conventional spinel type lithium manganese composite oxide, as positive electrode active material for rechargeable nonaqueous electrolyte secondary batteries, and nonaqueous electrolyte secondary batteries using, as positive electrode active material, such a lithium-deficient manganese layered composite oxide.

Among various rechargeable secondary batteries, the lithium secondary battery with its high charge-discharge voltage and large charge-discharge capacity has shown much promise as source of electricity for electric vehicles to meet the recent intense demand for zero-emission vehicles in environmental problem.

In consideration of some aspects of $LiCoO_2$ such as the stability in operating environment, cost and natural reserves of $LiCoO_2$ used as positive electrode active material for a lithium secondary battery, investigation is currently under way on spinel structure lithium manganese composite oxide ($LiMn_2O_4$) as positive electrode active material of a secondary battery for an automotive vehicle. Japanese Published Patent Applications, Publication (Kokai) Nos. 11(1999)-171550 and 11(1999)-73962 show spinel structure lithium manganese composite oxides as positive electrode active material of a secondary battery.

SUMMARY OF THE INVENTION

However, $LiMn_2O_4$ as positive electrode active material is deficient in durability at high temperatures and liable to cause deterioration in performance of the negative electrode due to dissolution of the positive electrode material into the electrolyte. To meet these problems, technique is on trial, of substituting various elements such as transition metals and typical metallic elements, for part of Mn. However, the partial substitution of various element for Mn to improve the high temperature cycle durability as disclosed in Published Japanese Patent Application, Publication (Kokai) No. 11(1999)-71115 is liable to cause distortion in the crystal structure and hence deteriorate the cycle durability at room temperature. Moreover, an increase in the amount of substitution for further improvement of the stability of the crystal structure tends to lower the capacity of the active material.

As to the capacity, lithium cobalt oxides ($LiCoO_2$: the active material capacity=140 mAh/g) are higher in capacity than spine) type lithium manganese composite oxides ($LiMn_2O_4$: the active material capacity=100 mAh/g). However, lithium cobalt oxides are disadvantageous in the stability etc., as mentioned before. Therefore, a desired positive electrode active material is a high-capacity Mn containing lithium composite oxide which is higher in the Li content in the crystal structure than the spinel lithium manganese composite oxides ($LiMn_2O_4$) and which is superior in stability in operating environment to the lithium cobalt oxides.

In such a high-capacity type positive electrode active material for a lithium secondary battery, the lithium content in a chemical formula based on the crystal structure is determinative. Japanese Patent 2870741 seeks for a high-capacity Mn containing lithium composite oxide on the basis of crystal-chemical studies.

A recent report (A. Robert Armstrong & P. G. Bruce "Synthesis of layered $LiMnO_2$ as an electrode for rechargeable lithium batteries", Nature, vol.381 (1996) p499) reveals $LiMnO_2$ layered oxide has a positive electrode active material capacity of about 270 mAh/g, more than twice of that of a conventional spinel structure lithium manganese oxide.

With this layered oxide, a sufficient charge-discharge characteristic is obtainable at 55° C., for example. However, the active material capacity decreases to about one third at room temperature. Moreover, the capacity is decreased gradually by repetition of charge and discharge at temperatures over room temperature, so that the cycle durability is insufficient.

It is therefore an object of the present invention to provide a lithium manganese layered composite oxide positive electrode active material which is higher in capacity than the conventional spinel structure lithium manganese composite oxide, and advantageous in high temperature cycle durability to the conventional layered structure lithium manganese composite oxide, and to provide a high-performance lithium secondary battery using this high-capacity lithium manganese layered composite oxide.

According to the present invention, a positive electrode active material for a nonaqueous electrolyte secondary battery, comprises: a lithium-containing manganese composite oxide having a layered crystal structure represented by the general formula $LiMeO_2$. The lithium-containing manganese composite oxide is deficient in lithium with respect to a stoichiometric composition in the general formula $LiMeO_2$, Me is a second constituent comprising Mn as a main component, and a substitute metal substituting for a part of Mn.

The lithium-containing manganese composite oxide is preferably represented by the formula $Li_{1-x}Mn_{1-y}M_yOz$ where M is the substitute metal, x is a lithium deficiency quantity, y is a substitution quantity of the substitute metal substituting for a part of Mn, and z is an oxygen quantity z. The lithium deficiency quantity x is a rational number in the range of $0<x<1$. The substitution quantity y is a rational number in the range of $0<y<1$. The oxygen quantity z is equal to or smaller than 2. The oxygen quantity may be equal to 2, or may be smaller than 2 and greater than zero. The oxygen quantity z may be equal to $_{2-\delta}$ ($z=2-\delta$), and $\delta$ may be in the range of $\delta \leq 0.2$.

BRIEF DESCRIPTION OF THE DRAWINGS

Figure is a view showing a nonaqueous secondary battery according to one embodiment of the present invention.

DETAILED DESCRIPTION OF THE INVENTION

An ordinary NaCl type MO crystal (where M is metallic element and O is oxygen) such as nickel oxide NiO has a crystal structure of metal (Ni) layers and oxygen layers stacked alternately in the <111> direction. On the other hand, a conventional layered $LiMO_2$ composite oxide (M is Ni, Co or Mn), a layered lithium manganese composite oxide, for example, has a layered structure of oxygen layer—Mn layer—oxygen layer—Li layer—oxygen layer—Mn layer—oxygen layer. The oxygen layers and metal layers are alternated, and the layers having metal elements are orderly arranged in an alternating manner.

Attention has been paid to the conventional NaCl type MO crystal and the layered structure $LiMO_2$ composite oxide which are thought to be very similar in structure, and the inventors of this application has conceived that the layered structure $LiMO_2$ composite oxide is repetition of MO crystal block. The view reached from this notion is that the layered $LiMO_2$ composite oxide has a structure of regular repetition of [LiO][MO] block in which the MO blocks [MO] and LiO blocks [LiO] are arranged alternately.

By applying this view of the block structure, the crystal structure of known sodium manganese oxide $Na_{2/3}MnO_2$ is expressed as $[Na_{2/3}O][MnO]$. This oxide is considered to have a structure formed by regularly making deficient the Na occupancy in the [NaO] block in the [NaO][MO] block structure. This suggests the possibility of creating a new layered structure lithium manganese oxide. Such contemplation has been applied to the [LiO][MO] block structure, and the notion reached by the inventors of this application is that it is possible to create new layered lithium manganese composite oxide by regularly making deficient the Li occupancy in [LiO] block. Furthermore, the crystal-chemical difference between Li site and Mn site is small by nature, and this view is applicable to the [MO] blocks.

However, in order to use such a layered oxide as a positive electrode material of a lithium secondary battery, in the case of a manganese oxide as an example, it is desirable to increase the amount of Mn which undergoes significant valence change during cyclic charge and discharge operations. Therefore, simple removal of M in the [MO] block is inadequate.

On the other hand, the use of a positive electrode active material represented by the chemical formula $LiMn_{1-y}M_yO_{2-\delta}$ (where M is a substitute element, and y is a rational number in the range of 0~0.25) as proposed by the above-mentioned Japanese Patent 2,870,741 is effective in improving the capacity and durability as compared to the ordinary spinel type, but inadequate in performance in a low temperature region below room temperature. The mere substitution at Mn sites is insufficient to stabilize the distortion in the crystal and chemical bond, so that the performance in the low temperature region becomes poorer.

After assiduous studies on effects of cation defect, the inventors of this application has reached findings that selection of regular element substitution quantity simultaneous with the defect is effective in stabilizing crystal distortion and chemical bond, and in obtaining new manganese layered composite oxide positive electrode active material which is superior in cycle stability and durability stability, durability and restraint of reaction with the electrolyte.

When the view of the block structure is applied to a manganese layered composite oxide according to material design guidelines based on these findings, an NaCl type Li-deficient layered composite oxide $Li_{1-x}MnO_2$ can be expressed as $[Li_{1-x}O][MnO]$. The regular lithium-deficiency acts to stabilize the crystal structure and improve the cycle durability. The lithium deficiency quantity x can be ½, ⅓, ⅔, ¼, ⅕, ⅖, ⅙ . . . , ⅛ and so on. Further to maintain the durability stability at high temperatures, the regular substitution of Mn sites for another metal elements is possible to form a block structure of $[Li_{1-x}O][Mn_{1-y}M_yO]$. When, for example, x=⅓ and y=½, the block structure is $[Li_{2/3}O][Mn_{1/2} M_{1/2}O]$. When M=Ni, it is possible to obtain a compound of $Li_{2/3}Mn_{1/2}Ni_{1/2}O_2$.

A positive electrode active material reached after the assiduous studies includes at least a lithium-containing manganese composite oxide having a layered crystal structure represented by the general formula $LiMeO_2$. The lithium-containing manganese composite oxide is deficient in lithium as compared to the stoichiometric composition in the general formula $LiMeO_2$. Me is a second constituent which includes at least Mn as a main component, and an additional substitute metal which substitutes for a part of Mn.

The lithium-containing manganese composite oxide may be represented by the formula $Li_{1-x}Mn_{1-y}M_yO_2$ or $Li_{1-x}Mn_{1-y}M_yO_{2-\delta}$. In this case, the lithium deficiency quantity x is a rational number greater than zero and smaller than one (0<x<1), and the substitution quantity y of the additional metal substituting for a part of Mn is a rational number greater than zero and smaller than one (0<y<1).

The lithium deficiency quantity x may be equal to a ratio a/b (x=a/b) of a first integer a selected from natural numbers from 1 to 30 (1≦a≦30), to a second integer b which is selected from the natural numbers from 1 to 30 (1≦b≦30) and which is greater than the first integer a (a<b), and the substitution quantity y may be equal to a ratio c/d (y=c/d) of a third integer c selected from the natural numbers from 1 to 30 (1≦c≦30), to a fourth integer d which is selected from the natural numbers from 1 to 30 (1≦d≦30) and which is greater than the third integer c (c<d).

A composition variation width of each of the lithium deficiency quantity x, and the substitution quantity y may be in the range of ±5%.

The lithium deficiency quantity x may be in the range of 0.03<x≦0.5. The substitution quantity y may be in the range of 0.03<y≦0.5.

In the case of $Li_{1-x}Mn_{1-y}M_yO_{2-\delta}$, an oxygen nonstoichiometry quantity δ may be in the range of δ≦0.2.

The substitute metal M is not Mn and preferably the substitute metal M includes at least one metal selected from the group consisting of transition metals and typical metallic elements. The substitute metal M may includes at least one selected from the group consisting of Co, Ni, Fe, Al, Ga, In, V, Nb, Ta, Ti, Zr, Ce and Cr.

A nonaqueous secondary battery according to the present invention includes at least a negative electrode and a positive electrode including at least such a lithium-containing manganese layered composite oxide. Preferably, the negative electrode includes at least a negative electrode active material capable of retaining and releasing lithium ions, and the positive electrode includes at least a positive electrode active material capable of retaining and releasing lithium ions. An electrolyte may be a lithium ion conductive nonaqueous liquid electrolyte.

In the general formula $Li_{1-x}Mn_{1-y}M_yO_z$ (which may be $Li_{1-x}Mn_{1-y}M_yO_2$ or $Li_{1-x}Mn_{1-y}M_yO_{2-\delta}$), the lithium deficiency quantity x is equal to a rational number in the range greater than zero and smaller than one (0<x<1). The lithium deficiency quantity x represents an amount of deficient Li deficient as compared to the stoichiometric composition in the lithium-containing manganese layered composite oxide. The lithium deficiency quantity x may be in the range of 0.1<x<0.33 or in the range of 0.03<x≦0.5. It is not desirable to decrease the lithium deficiency quantity x too much because of resulting adverse influence on the cycle stability and the tendency to degradation during charge and discharge operations. On the other hand, an excessive increase of the lithium deficiency quantity x increases an undesirable tendency to insufficient capacity.

The metal substitution quantity y is equal to a rational number in the range greater than zero and smaller than one (0<y<1). The metal substitution quantity y represents an amount of the substitute metal M at Mn sites. The metal substitution quantity y may be in the range of $0.03 < x \leq 0.5$. It is not desirable to decrease the lithium deficiency quantity y too much because of resulting adverse influence on the tendency to degradation during charge and discharge operations. On the other hand, an excessive increase of the metal substitution quantity y increases an undesirable tendency to insufficient capacity.

The lithium deficiency quantity x may be equal to a ratio (or quotient) a/b ($x = a/b$). The numerator a is smaller than the denominator b ($a < b$). Each of the numerator a and the denominator b is a positive integer which is equal to or greater than one and which is equal to or smaller than 30 ($1 \leq a \leq 30$, $1 \leq b \leq 30$). If the integer a and/or the integer b is smaller than one, or greater than 30, then the effects of the lithium deficiency become poor, and the cycle durability becomes insufficient. The cycle durability becomes lower if the inequality $a < b$ is not satisfied.

The metal substitution quantity y of the substitute metal M at Mn sites may be equal to a ratio (or quotient) c/d ($x = c/d$). The numerator c is smaller than the denominator d ($c < d$). Each of the numerator c and the denominator d is a positive integer which is equal to or greater than one and which is equal to or smaller than 30 ($1 \leq c \leq 30$, $1 \leq d \leq 30$). If the integer c and/or the integer d is smaller than one, or greater than 30, then the effects of the metal substitution become poor, and the cycle durability becomes insufficient. The cycle durability becomes lower if the inequality $c < d$ is not satisfied.

The composition variation width of the lithium deficiency quantity x may be within ±5%. The cycle durability becomes insufficient if the variation of x is greater than +5% of if the variation of x is smaller than −5%. The composition variation width of the metal substitution quantity y may be within ±5%. The cycle durability becomes insufficient if the variation of y is greater than +5% of if the variation of y is smaller than −5%.

The oxygen nonstoichiometry quantity δ represents an amount of oxygen defect. Preferably, the oxygen defect quantity δ is equal to or smaller than 0.2 ($\delta \leq 0.2$). When the oxygen defect quantity δ is greater than 0.2, the crystal structure becomes unstable, and the tendency to degradation increases.

As a production process for producing the lithium-deficient manganese composite oxide according to the present invention, it is possible to employ a process including at least a mixing step of mixing manganese compound, lithium compound, and compound of the substitute metal (transition metal or typical metallic element) homogeneously at a predetermined molar ratio, and a calcining step of calcining the mixture in the atmosphere of low oxygen concentration.

Examples of the manganese compound which can be used in this process are; electrolytic manganese dioxide, chemically synthesized manganese dioxide, dimanganese trioxide, γ-MnOOH, manganese carbonate, manganese nitrate, and manganese acetate. A desirable range of the average particle diameter of the manganese compound powder is 0.1~100 μm. Preferably, the average particle diameter is equal to or smaller than 20 μm. If the grain size is too large, the reaction between the manganese compound and the lithium compound becomes very slow, and the homogeneity of the product material becomes lower.

Examples of the lithium compound are; lithium carbonate, lithium hydroxide, lithium nitrate, lithium oxide, and lithium acetate. Preferable examples are lithium carbonate and lithium hydroxide. Preferably, the average particle diameter is equal to or smaller than 30 μm.

Examples of the transition metal compound are; nitrates, acetates, citrates, chlorides, hydrides and oxides of the transition metals. Examples of the typical metallic element compound are; nitrates, acetates, citrates, chlorides, hydrides and oxides of the typical metallic elements.

Examples of the mixing step are; dry or wet blending of manganese compound, lithium compound and transition metal or typical metallic element compound; dry or wet blending of manganese-transition metal complex compound or manganese-typical metallic element complex compound synthesized from manganese compound and transition metal or typical metallic element compound, and lithium compound; dry or wet blending of $LiMnO_2$ and transition metal or typical metallic element compound; and coprecipitation from a solution of lithium compound, manganese compound and transition metal or typical metallic element compound, by the use of at least one of citric acid, ammonium bicarbonate, etc.

Preferable for obtaining a homogeneous product material is a method including at least a step of obtaining a coprecipitation product by dripping, into aqueous solution of lithium hydroxide, a mixed aqueous solution prepared by completely or sufficiently dissolving manganese compound and transition metal or typical metallic element compound in ion-exchanged water, and a step of dry or wet blending of the obtained coprecipitation product and lithium compound in an amount corresponding to a deficiency with respect to a target composition ratio. Alternatively, it is possible to employ a method of calcining the coprecipitation product produced by the above-mentioned method and thereby obtaining a manganese-transition metal complex oxide or a typical metallic element complex oxide, and mixing the product material of the calcination with a lithium compound of an amount corresponding to a deficiency with respect to the target composition ratio.

The calcination is carried out in an atmosphere of low oxygen concentration. A preferable atmosphere for the calcination is an oxygen-free atmosphere of gas such as nitrogen, argon or carbon dioxide. Desirably, the oxygen partial pressure in the atmosphere is equal to or lower than 1000 ppm. More desirably, the oxygen partial pressure is equal to or lower than 100 ppm.

A desirable calcination temperature is equal to or lower than 1100° C. More desirably, the calcination temperature is equal to or lower than 950° C. Temperatures above 1100° C. tend to incur decomposition of the product material. Desirably, the calcination time is in the range of 1~48 hours. More desirably, the calcination time is in the range of 5~24 hours. The calcination may be a single stage calcination or a multi-stage calcination consisting of two or more calcination steps of different calcination temperatures.

It is possible to efficiently lower the oxygen partial pressure in the calcination atmosphere by addition, to the mixture of the lithium compound and the manganese compound, of carbon containing compound, preferably carbon powder such as carbon black or acetylene black, or organic substance such as citric acid. The amount of the addition is in the range of 0.05~10%. When the amount of the addition is on the smaller side of this range, the effect is too low. When the amount of the addition is on the greater side, the possibility of byproduct becomes high, and the purity of the target product becomes low because of residue of the additive carbon containing compound.

In the nonaqueous electrolyte secondary battery according to the present invention, it is possible to use, as the material of the negative electrode, any of negative electrode materials for nonaqueous secondary batteries. Examples are; metallic lithium, lithium alloy, metallic oxide such as $SnSiO_3$, metallic nitride such as $LiCoN_2$ and carbon material. Examples of the carbon material are; coke, natural graphite, artificial graphite, and non-graphitizable carbon.

As the electrolytic solution or liquid electrolyte, it is possible to use lithium salt, as electrolyte, dissolved in nonaqueous solvent. Examples of the electrolyte are; $LiClO_4$, $LiAsF_6$, $LiPF_6$, $LiBF_4$, $LiCF_3SO_3$ and $Li(CF_3SO_2)_2N$.

As organic solvent, carbonates, lactones, ethers and others are candidates. Examples are; ethylene carbonate, propylene carbonate, diethyl carbonate, dimethyl carbonate, methyl ethyl carbonate, 1, 2-dimethoxy ethane, 1, 2-diethoxy ethane, tetrahydrofuran, 1,3-dioxolan, and γ-butyrolactone. It is possible to use any one or more of these solvents singly or in combination. The concentration of the electrolyte dissolved in the solvent can be 0.5~2.0 mole/liter.

Besides these examples, it is possible to use solid or viscous liquid of one or more of the above mentioned electrolytes dispersed homogeneously in high polymer matrix. This solid or viscous liquid may be further impregnated with nonaqueous solvent. As the high polymer matrix, it is possible to employ polyethylene oxide, polypropylene oxide, polyacrylonitrile or polyvinylidene fluoride.

It is possible to provide a separator for preventing short-circuit between the positive and negative electrodes. Examples of the separator are; porous sheet and nonwoven fabric of polyethylene, polypropylene, or cellulose.

[Practical Examples]

In the following practical examples and comparative example, positive and negative electrodes were prepared in the following manner, and encapsulated type nonaqueous solvent battery cells were produced. These practical examples are not exhaustive listings, and the present invention is not limited to these practical examples. The positive electrode material was prepared by the undermentioned coprecipitation method in practical examples 1~8, and by the undermentioned solid state mixing in practical examples 9~16 and a comparative example.

(Synthesis by Coprecipitation)

A mixed aqueous solution having a predetermined mole ratio of Mn and a transition metal M was prepared by using manganese nitrate and a compound containing the transition metal element M. Then, brown slurry was obtained by dripping the mixed aqueous solution over a time equal to or longer than 30 minutes while 10% aqueous solution of lithium hydroxide was agitated and the pH was held equal to or higher than 9. The slurry was filtered and cleaned with ion-exchanged water. After drying, the resulting brown solid substance was crushed until the average particle diameter becomes smaller than or equal to 20 μm. To this product, lithium hydroxide monohydrate was added in an amount to obtain a stoichiometric ratio corresponding to a value of a ratio Li/(Mn+M) listed in a table 1 below, and then mixed in a mortar. Thereafter, the mixture was subjected to heat treatment at 900° C. for 24 hours in a stream of argon. In this way, obtained were lithium manganese transition metal composite oxides having chemical compositions listed in rows in Table 1 for the practical examples 1~8.

(Synthesis by Solid Phase Mixing)

Lithium hydroxide monohydrate powder, dimanganese trioxide powder, and compound of a transition metal M listed in Table 1 were added at a predetermined mole ratio, and mixed in a mortar. Thereafter, the mixture was subjected to heat treatment at 900° C. for 24 hours in an atmosphere of argon. After cooling, the calcined product was crushed in a mortar. In this way, positive electrode materials having mole ratios of lithium, manganese and transition metal as listed in the rows of practical examples 9~16 and comparative example 1 in Table 1 were obtained.

(Production of Cell)

Each of the obtained positive electrode materials was mixed with acetylene black as conducting material and PTFE powder as binding material at a weight ratio of 80:16:4. The mixture was molded into a circular disc having a diameter of 12 mm by a pressure of 2 t/cm². The molded mixture was subjected to heat treatment at 150° C. for 16 hours to produce a positive electrode disc. Then, a negative electrode member was formed by compressing lithium metal in the shape of a circular disc having a diameter of 12 mm and mesh-shaped negative electrode collector plate of stainless steel.

As the electrolyte, use was made of a solution of a combined solvent obtained by mixing ethylene carbonate and diethyl carbonate at a volume ratio of 1:1, and $LiPF_6$ dissolved in the combined solvent at a concentration of 1 mole/liter. Polypropylene film was used as a separator.

SUS sheet was used as a collector of the positive electrode. Leads were taken out, respectively, from the positive and negative electrodes, and an element was formed by placing the positive and negative electrode members so as to confront each other across the separator. While being pressed by a spring, this element was interposed between two PTFE plates. Furthermore, the sides of the element were covered by PTFE plates, and a sealed nonaqueous battery cell was completed. The production of the cell was carried out in the atmosphere of argon.

(Evaluation)

The thus-produced nonaqueous battery cells were examined to evaluate the charge-discharge cycle performance by repetition of charge-discharge cycle at a temperature of 60° C., at a constant current of 0.5 mA/cm² in a voltage range from 4.3 V to 2.0 V. Table 1 shows the number of charge-discharge cycles reached when the discharge capacity decreases below 90% of the initial discharge capacity.

In the following, each of the practical examples are expressed in terms of the block structure $[Li_{1-x}O][Mn_{1-y}M_yO]$ according to the before-mentioned guiding principle of the present invention.

(Practical Example 1)

$Li_{0.67}Mn_{0.5}Co_{0.5}O_{2-\delta}$ in a row of Table 1 for a first practical example is expressed, in the form of block structure representation taking no account of the oxygen defect (oxygen nonstoichiometry δ), as $[Li_{2/3}O][Mn_{1/2}Co_{1/2}O]$. In the first practical example, x=⅓, y=½, and M=Co in the general block structure formula $[Li_{1-x}O][Mn_{1-y}M_yO]$.

(Practical Example 2)

Similarly, $Li_{0.83}Mn_{0.5}Co_{0.5}O_{2-\delta}$ in a row of Table 1 for a second practical example is expressed, in the form of block structure representation taking no account of the oxygen defect (oxygen nonstoichiometry δ), as $[Li_{5/6}O][Mn_{1/2}Co_{1/2}O]$. In the second practical example, x=⅙, y=½, and M=Co in the general block structure formula $[Li_{1-x}O][Mn_{1-y}M_yO]$.

(Practical Example 3)

$Li_{0.67}Mn_{0.5}Co_{0.5}O_{2-\delta}$ in a row of Table 1 for a third practical example is expressed, in the form of block structure representation taking no account of the oxygen defect (oxygen nonstoichiometry δ), as $[Li_{29/30}O][Mn_{1/2}Co_{1/20}]$. In the third practical example, x=1/30, y=1/2, and M=Co in the general block structure formula $[Li_{1-x}O][Mn_{1-y}M_yO]$.

(Practical Example 4)

$Li_{0.75}Mn_{0.75}Co_{0.25}O_{2-\delta}$ in a row of Table 1 for a fourth practical example is expressed, in the form of block structure representation taking no account of the oxygen defect (oxygen nonstoichiometry $\delta$), as $[Li_{3/4}O][Mn_{3/4}Co_{1/4}O]$. In the fourth practical example, x=1/4, y=1/4, and M=Co in the general block structure formula $[Li_{1-x}O][Mn_{1-y}M_yO]$.

(Practical Example 5)

$Li_{0.83}Mn_{0.75}Ni_{0.25}O_{2-\delta}$ in a row of Table 1 for a fifth practical example is expressed, in the form of block structure representation taking no account of the oxygen defect (oxygen nonstoichiometry $\delta$), as $[Li_{5/6}O][Mn_{3/4}Ni_{1/4}O]$. In the fifth practical example, x=1/6, y=1/4, and M=Ni in the general block structure formula $[Li_{1-x}O][Mn_{1-y}M_yO]$.

(Practical Example 6)

$Li_{0.83}Mn_{0.67}Fe_{0.33}O_{2-\delta}$ in a row of Table 1 for a sixth practical example is expressed, in the form of block structure representation taking no account of the oxygen defect (oxygen nonstoichiometry $\delta$), as $[Li_{5/6}O][Mn_{2/3}Fe_{1/3}O]$. In the sixth practical example, x=1/6, y=1/3, and M=Fe in the general block structure formula $[Li_{1-x}O][Mn_{1-y}M_yO]$.

(Practical Example 7)

$Li_{0.83}Mn_{0.75}Al_{0.25}O_{2-\delta}$ in a row of Table 1 for a seventh practical example is expressed, in the form of block structure representation taking no account of the oxygen defect (oxygen nonstoichiometry $\delta$), as $[Li_{5/6}O][Mn_{3/4}Al_{1/4}O]$. In the seventh practical example, x=1/6, y=1/4, and M=Al in the general block structure formula $[Li_{1-x}O][Mn_{1-y}M_yO]$.

(Practical Example 8)

$Li_{0.83}Mn_{0.75}Cr_{0.25}O_{2-\delta}$ in a row of Table 1 for an eighth practical example is expressed, in the form of block structure representation taking no account of the oxygen defect (oxygen nonstoichiometry $\delta$), as $[Li_{5/6}O][Mn_{3/4}Cr_{1/4}O]$. In the eighth practical example, x=1/6, y=1/4, and M=Cr in the general block structure formula $[Li_{1-x}O][Mn_{1-y}M_yO]$.

(Practical Example 9)

$Li_{0.83}Mn_{0.75}Ga_{0.25}O_{2-\delta}$ in a row of Table 1 for a ninth practical example is expressed, in the form of block structure representation taking no account of the oxygen defect (oxygen nonstoichiometry $\delta$), as $[Li_{5/6}O][Mn_{3/4}Ga_{1/4}O]$. In the ninth practical example, x=1/6, y=1/4, and M=Ga in the general block structure formula $[Li_{1-x}O][Mn_{1-y}M_yO]$.

(Practical Example 10)

$Li_{0.83}Mn_{0.75}In_{0.25}O_{2-\delta}$ in a row of Table 1 for a tenth practical example is expressed, in the form of block structure representation taking no account of the oxygen defect (oxygen nonstoichiometry $\delta$), as $[Li_{5/6}O][Mn_{3/4}In_{1/4}]$. In the tenth practical example, x=1/6, y=1/4, and M=In in the general block structure formula $[Li_{1-x}O][Mn_{1-y}M_yO]$.

(Practical Example 11)

$Li_{0.83}Mn_{0.75}Zr_{0.25}O_{2-\delta}$ in a row of Table 1 for an eleventh practical example is expressed, in the form of block structure representation taking no account of the oxygen defect (oxygen nonstoichiometry $\delta$), as $[Li_{5/6}O][Mn_{3/4}Zr_{1/4}O]$. In the eleventh practical example, x=1/6, y=1/4, and M=Zr in the general block structure formula $[Li_{1-x}O][Mn_{1-y}M_yO]$.

(Practical Example 12)

$Li_{0.83}Mn_{0.75}V0.25O_{2-\delta}$ in a row of Table 1 for a twelfth practical example is expressed, in the form of block structure representation taking no account of the oxygen defect (oxygen nonstoichiometry $\delta$), as $[Li_{5/6}O][Mn_{3/4}V_{1/4}O]$. In the twelfth practical example, x=1/6, y=1/4, and M=V in the general block structure formula $[Li_{1-x}O][Mn_{1-y}M_yO]$.

(Practical Example 13)

$Li_{0.75}Mn_{0.875}Fe_{0.125}O_{2-\delta}$ in a row of Table 1 for a thirteenth practical example is expressed, in the form of block structure representation taking no account of the oxygen defect (oxygen nonstoichiometry $\delta$), as $[Li_{3/4}O][Mn_{7/8}Fe_{1/8}O]$. In the ninth practical example, x=1/4, y=1/8, and M=Fe in the general block structure formula $[Li_{1-x}O][Mn_{1-y}M_yO]$.

(Practical Example 14)

$Li_{0.83}Mn_{0.75}Nb_{0.25}O_{2-\delta}$ in a row of Table 1 for a fourteenth practical example is expressed, in the form of block structure representation taking no account of the oxygen defect (oxygen nonstoichiometry $\delta$), as $[Li_{5/6}O][Mn_{3/4}Nb_{1/4}O]$. In the fourteenth practical example, x=1/6, y=1/4, and M=Nb in the general block structure formula $[Li_{1-x}O][Mn_{1-y}M_yO]$.

(Practical Example 15)

$Li_{0.83}Mn_{0.75}Ta_{0.25}O_{2-\delta}$ in a row of Table 1 for a fifteenth practical example is expressed, in the form of block structure representation taking no account of the oxygen defect (oxygen nonstoichiometry $\delta$), as $[Li_{5/6}O][Mn_{3/4}Ta_{1/4}O]$. In the fifteenth practical example, x=1/6, y=1/4, and M=Ta in the general block structure formula $[Li_{1-x}O][Mn_{1-y}M_yO]$.

(Practical Example 16)

$Li_{0.83}Mn_{0.75}Ti_{0.25}O_{2-\delta}$ in a row of Table 1 for a sixteenth practical example is expressed, in the form of block structure representation taking no account of the oxygen defect (oxygen nonstoichiometry $\delta$), as $[Li_{5/6}O][Mn_{3/4}Ti_{1/4}O]$. In the sixteenth practical example, x=1/6, y=1/4, and M=Ti in the general block structure formula $[Li_{1-x}O][Mn_{1-y}M_yO]$.

(Comparative Example 1)

$Li_{1.0}Mn_{1.0}O_{2-\delta}$ in the row of Table 1 for a comparative example 1 is expressed, in the form of block structure representation taking no account of the oxygen defect (oxygen nonstoichiometry $\delta$), as $[LiO][MnO]$. In this comparative example, x=0, and y=0 in the general block structure formula $[Li_{1-x}O][Mn_{1-y}M_yO]$.

TABLE 1

| Samples | Transition Metal compound | Composition of Positive Electrode Material | $\delta$ | Number of Cycles |
|---|---|---|---|---|
| Practical Example 1 | Cobalt Nitrate (II) | Li0.67Mn0.5Co0.5O2-δ | 0.14 | 105 |
| Practical Example 2 | Cobalt Nitrate (II) | Li0.83Mn0.5Co0.5O2-δ | 0.05 | 126 |
| Practical Example 3 | Cobalt Nitrate (II) | Li0.967Mn0.5Co0.5O2-δ | 0.01 | 113 |
| Practical Example 4 | Cobalt Nitrate (II) | Li0.75Mn0.75Co0.25O2-δ | 0.10 | 139 |
| Practical Example 5 | Nickel Nitrate (II) | Li0.83Mn0.75Ni0.25O2-δ | 0.03 | 121 |
| Practical Example 6 | Iron Nitrate (III) | Li0.83Mn0.67Fe0.33O2-δ | 0.06 | 81 |
| Practical Example 7 | Aluminum Nitrate | Li0.83Mn0.75Al0.25O2-δ | 0.06 | 119 |
| Practical Example 8 | Chromium Nitrate (III) | Li0.83Mn0.75Cr0.25O2-δ | 0.07 | 127 |
| Practical Example | Gallium Nitrate | Li0.83Mn0.75Ga0.25O2-δ | 0.06 | 41 |

TABLE 1-continued

| Samples | Transition Metal compound | Composition of Positive Electrode Material | δ | Number of Cycles |
|---|---|---|---|---|
| Practical Example 9 | (III) Indium Hydroxide | Li0.83Mn0.75In0.25O2-δ | 0.05 | 33 |
| Practical Example 10 | (III) Zirconium Hydroxide | Li0.83Mn0.75Zr0.25O2-δ | 0.04 | 29 |
| Practical Example 11 | (IV) Vanadium Oxide (III) | Li0.83Mn0.75V0.25O2-δ | 0.04 | 45 |
| Practical Example 12 | Iron Oxide (III) | Li0.75Mn0.875Fe0.125O2-δ | 0.11 | 73 |
| Practical Example 13 | Niobium Oxide (II) | Li0.83Mn0.75Nb0.25O2-δ | 0.02 | 63 |
| Practical Example 14 | Tantalum Oxide (V) | Li0.83Mn0.75Ta0.25O2-δ | 0.03 | 59 |
| Practical Example 15 | Titanium Oxide (IV) | Li0.83Mn0.75Ti0.25O2-δ | 0.04 | 86 |
| Comparative Example | — | LiMnO2-δ | 0 | 10 |

The lithium secondary battery cell of each of the first through sixteenth practical examples employs, as positive electrode material, a lithium-deficient manganese layered composite oxide represented by the general formula $Li_{1-x}Mn_{1-y}M_yO_2\text{-}\delta$. In this formula, M is not Mn and comprises at least one of transition metal elements and typical metallic elements. More specifically, M is at least one selected from the group consisting of Co, Ni, Fe, Al, Ga, In, V, Nb, Ta, Ti, Zr, Ce and Cr. Preferably, the lithium deficiency quantity x of regular lithium defect is a rational number greater than 0.03, and smaller than or equal to 0.5 ($0.03 < x \leq 0.5$), the metal substitution quantity y is a ration number greater than 0.03, and smaller than or equal to 0.5 ($0.03 < y \leq 0.5$), and the oxygen nonstoichiometry quantity δ is greater than zero, and smaller than or equal to 0.02 ($\delta \leq 0.2$). The lithium-deficient manganese layered composite oxide of each of the first through sixteenth practical examples has the crystal structure prepared by controlling the lithium deficiency quantity x, the metal substitution quantity y and the oxygen nonstoichiometry quantity δ so as to satisfy these conditions. The lithium-deficient manganese layered composite oxide positive electrode active material of each practical example is fairly improved in cycle durability as compared to the comparative example. The lithium secondary battery cells of these practical examples are especially suitable for batteries for EV and HEV because of the compactness and prolonged lifetime.

Figure shows a nonaqueous electrolyte secondary battery employing the positive electrode active material in one of the first through sixteenth practical example. The nonaqueous electrolyte secondary battery includes a positive electrode 1, a negative electrode 2, a separator 3, a positive electrode lead 4, a negative electrode lead 5, a cover 6 on the positive electrode's side, and a battery casing 7.

This application is based on a basic Japanese Patent Application No. 2000-058097. The entire contents of the basic Japanese Patent Application No. 2000-058097 with a filing date of Mar. 3, 2000 in Japan are hereby incorporated by reference.

Although the invention has been described above by reference to certain embodiments and practical examples of the invention, the invention is not limited to the embodiments and practical examples described above.

Modifications and variations of the embodiments and practical examples described above will occur to those skilled in the art in light of the above teachings. The scope of the invention is defined with reference to the following claims.

What is claimed is:

1. A positive electrode active material for a nonaqueous electrolyte secondary battery, the positive electrode active material comprising:
   a lithium-containing manganese composite oxide having
      a layered crystal structure represented by the general formula $LiMeO_2$, the lithium-containing manganese composite oxide being deficient in lithium with respect to a stoichiometric composition in the general formula $LiMeO_2$, a second constituent Me comprising Mn as a main component, and a substitute metal substituting for a part of Mn.

2. The positive electrode active material as claimed in claim 1, wherein the lithium-containing manganese composite oxide is represented by the formula $Li_{1-x}Mn_{1-y}M_yOz$ where M is the substitute metal, x is a lithium deficiency quantity, y is a substitution quantity of the substitute metal substituting for a part of Mn, and z is an oxygen quantity z, the lithium deficiency quantity x being a rational number in the range of $0 < x < 1$, the substitution quantity y being a rational number in the range of $0 < y < 1$, the oxygen quantity z being equal to or smaller than 2.

3. The positive electrode active material as claimed in claim 2 wherein the lithium-containing manganese composite oxide has a crystal structure in which the lithium deficiency quantity x and the substitution quantity y of the substitute metal at Mn sites are controlled to be in the ranges of $0 < x < 1$ and $0 < y < 1$.

4. The positive electrode active material as claimed in claim 2, wherein the lithium deficiency quantity x is equal to a ratio a/b of a first integer a selected from natural numbers from 1 to 30, to a second integer b which is selected from the natural numbers from 1 to 30 and which is greater than the first integer a, and the substitution quantity y is equal to a ratio c/d of a third integer c selected from the natural numbers from 1 to 30, to a fourth integer d which is selected from the natural numbers from 1 to 30 and which is greater than the third integer c.

5. The positive electrode active material as claimed in claim 4 wherein a composition variation of the lithium deficiency quantity x is in the range of ±5%, and a composition variation of the substitution quantity y is in the range of ±5%.

6. The positive electrode active material as claimed in claim 2, wherein the substitute metal M is not Mn and the substitute metal M comprises at least one metal selected from the group consisting of transition metals and typical metallic elements.

7. The positive electrode active material as claimed in claim 2, wherein the substitute metal M comprises at least one selected from the group consisting of Co, Ni, Fe, Al, Ga, In, V, Nb, Ta, Ti, Zr and Ce.

8. The positive electrode active material as claimed in claim 2, wherein the substitute metal M comprises at least Cr.

9. The positive electrode active material as claimed in claim 2, wherein the lithium deficiency quantity x is greater than 0.03, and smaller than or equal to 0.5.

10. The positive electrode active material as claimed in claim 2, wherein the substitution quantity y is greater than 0.03, and smaller than or equal to 0.5.

11. The positive electrode active material as claimed in claim 2, wherein the lithium-containing manganese composite oxide is represented by the formula $Li_{1-x}Mn_{1-y}M_yO_2$, and the oxygen quantity z is equal to two.

12. The positive electrode active material as claimed in claim 2, wherein the lithium-containing manganese composite oxide is represented by the formula $Li_{1-x}Mn_{1-y}M_yO_2$-$\delta$.

13. The positive electrode active material as claimed in claim 12, wherein an oxygen nonstoichiometry quantity $\delta$ is smaller than or equal to 0.2.

14. The positive electrode active material as claimed in claim 13, wherein the substitute metal M is not Mn and the substitute metal M comprises at least one metal selected from the group consisting of transition metals and typical metallic elements; wherein the lithium deficiency quantity x is greater than 0.03, and smaller than or equal to 0.5; and wherein the substitution quantity y is greater than 0.03, and smaller than or equal to 0.5.

15. A nonaqueous electrolyte secondary battery comprising:
   a negative electrode; and
   a positive electrode comprising a positive electrode active material which comprises a lithium-containing manganese composite oxide having a layered crystal structure represented by the general formula $LiMeO_2$, the lithium-containing manganese composite oxide being deficient in lithium with respect to a stoichiometric composition in the general formula $LiMeO_2$, a second constituent Me comprising Mn as a main component, and a substitute metal substituting for a part of Mn.

16. The nonaqueous electrolyte secondary battery as claimed in claim 15, wherein the negative electrode comprises at least one selected from the group consisting of Li metal, composite oxide, nitride and carbon.

17. The nonaqueous secondary battery as claimed in claim 15, wherein the lithium-containing manganese composite oxide is represented by the formula $Li_{1-x}Mn_{1-x}M_yOz$ where M is the substitute metal, x is a lithium deficiency quantity, y is a substitution quantity of the substitute metal substituting for a part of Mn, and z is an oxygen quantity z, the lithium deficiency quantity x being in the range of 0<x<1, the substitution quantity y being in the range of 0<y<1, the oxygen quantity z being equal to or smaller than 2.

18. The nonaqueous secondary battery as claimed in claim 17, wherein the substitute metal M is not Mn and the substitute metal M comprises at least one metal selected from the group consisting of transition metals and typical metallic elements; wherein the lithium deficiency quantity x is greater than 0.03, and smaller than or equal to 0.5; wherein the substitution quantity y is greater than 0.03, and smaller than or equal to 0.5; and wherein the oxygen quantity z is greater than one and smaller than or equal to 2.

19. The positive electrode active material as claimed in claim 2, wherein the substitution quantity y is smaller than or equal to 0.5.

20. The positive electrode active material as claimed in claim 2, wherein the lithium containing manganese composite oxide has a crystal structure formed by controlling the lithium deficiency quantity x in the range of $0.03<x\leq0.5$ and the substitution quantity y of the substitute metal at Mn sites is in the range of $0.03<y\leq0.5$.

* * * * *